(12) United States Patent
Rose

(10) Patent No.: US 11,894,754 B2
(45) Date of Patent: Feb. 6, 2024

(54) POWER TOOL INCLUDING UNIVERSAL MOTOR HAVING INTERPOLES

(71) Applicant: MILWAUKEE ELECTRIC TOOL CORPORATION, Brookfield, WI (US)

(72) Inventor: David Rose, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/708,539

(22) Filed: Mar. 30, 2022

(65) Prior Publication Data

US 2022/0320958 A1     Oct. 6, 2022

Related U.S. Application Data

(60) Provisional application No. 63/167,910, filed on Mar. 30, 2021.

(51) Int. Cl.
| | |
|---|---|
| *H02K 23/38* | (2006.01) |
| *H02K 7/14* | (2006.01) |
| *H02K 11/28* | (2016.01) |
| *H02K 11/33* | (2016.01) |

(52) U.S. Cl.
CPC ............. *H02K 7/145* (2013.01); *H02K 11/28* (2016.01); *H02K 11/33* (2016.01)

(58) Field of Classification Search
CPC ........ H02K 1/146; H02K 7/145; H02K 23/38; H02K 23/40; H02K 23/62
See application file for complete search history.

(56) References Cited

U.S. PATENT DOCUMENTS

| | | | |
|---|---|---|---|
| 458,646 A | | 9/1891 | Thomson |
| 1,434,974 A | * | 11/1922 | Turbayne ............... H02K 23/52 |
| | | | 290/31 |
| 1,690,142 A | * | 11/1928 | Tanner ................... H02K 47/16 |
| | | | 388/826 |
| 2,500,191 A | | 3/1950 | Royal |
| | | (Continued) | |

FOREIGN PATENT DOCUMENTS

| | | |
|---|---|---|
| DE | 2244101 A1 | 3/1974 |
| DE | 4440698 A1 | 6/1995 |
| | (Continued) | |

OTHER PUBLICATIONS

Milwaukee Electric Tool Corp., "1" SDS Plus Rotary Hammer," Cat. No. 5262-21, Operator's Manual, © 2017.

*Primary Examiner* — Dang D Le
(74) *Attorney, Agent, or Firm* — Michael Best & Friedrich LLP

(57) ABSTRACT

A hand held power tool that includes a housing, a power source input configured to receive power from a power source, and a brushed motor located within the housing. The brushed motor is configured to receive power from the power source input. The brushed motor includes a first primary stator pole including a first pole neck and a first pole arc, a second primary stator pole including a second pole neck and a second pole arc, a first stator interpole including a first interpole neck, and a second stator interpole including a second interpole neck. The first stator interpole and the second stator interpole are each positioned between the first primary stator pole and the second primary stator pole.

20 Claims, 4 Drawing Sheets

(56) References Cited

U.S. PATENT DOCUMENTS

| | | | |
|---|---|---|---|
| 3,521,100 A * | 7/1970 | Tamm | H02K 23/40 |
| | | | 310/216.058 |
| 3,576,456 A | 4/1971 | De Wolf | |
| 4,065,705 A | 12/1977 | Hicks et al. | |
| 5,063,319 A | 11/1991 | Mason et al. | |
| 5,677,586 A | 10/1997 | Horst | |
| 6,013,964 A | 1/2000 | Meyer | |
| 7,893,583 B2 * | 2/2011 | Du | H02K 3/325 |
| | | | 310/50 |
| 8,525,382 B2 | 9/2013 | Li et al. | |
| 8,680,738 B2 | 3/2014 | Liu et al. | |
| 8,749,106 B2 | 6/2014 | Liu et al. | |
| 8,844,118 B2 | 9/2014 | Hessenberger et al. | |

FOREIGN PATENT DOCUMENTS

| | | |
|---|---|---|
| DE | 19702195 C1 | 10/1998 |
| EP | 0730334 B1 | 4/1999 |
| EP | 0889575 B1 | 7/2007 |
| WO | 9103866 A1 | 3/1991 |
| WO | 9421027 A1 | 9/1994 |
| WO | 9736367 A1 | 10/1997 |

\* cited by examiner

POWER TOOL INCLUDING UNIVERSAL MOTOR HAVING INTERPOLES

RELATED APPLICATIONS

This application claims the benefit of U.S. Provisional Patent Application No. 63/167,910, filed Mar. 30, 2021, the entire content of which is hereby incorporated by reference.

BACKGROUND

Universal motors are commonly used in power tools for their performance and simplicity of use. Universal motors may be powered by both AC and/or DC power sources and provide similar performance at the output of the power tool.

SUMMARY

Hand held power tools described herein include a housing, a power source input configured to receive power from a power source, and a brushed motor located within the housing. The brushed motor is configured to receive power from the power source input. The brushed motor includes a first primary stator pole including a first pole neck and a first pole arc, a second primary stator pole including a second pole neck and a second pole arc, a first stator interpole including a first interpole neck, and a second stator interpole including a second interpole neck. The first stator interpole and the second stator interpole are each positioned between the first primary stator pole and the second primary stator pole.

Hand held power tools described herein include a housing and a motor located within the housing. The motor is configured to receive power from a power source. The motor includes a first primary stator pole including a first pole neck and a first pole arc, a second primary stator pole including a second pole neck and a second pole arc, a first stator interpole including a first interpole neck, and a second stator interpole including a second interpole neck. The first stator interpole and the second stator interpole are each positioned between the first primary stator pole and the second primary stator pole.

Power tools described herein include a housing and a motor located within the housing. The motor is configured to receive power from a power source and be operated in a forward direction of rotation and a reverse direction of rotation. The motor includes a first primary stator pole including a first pole neck and a first pole arc, a second primary stator pole including a second pole neck and a second pole arc, a first stator interpole including a first interpole neck, and a second stator interpole including a second interpole neck. The first stator interpole and the second stator interpole are each positioned between the first primary stator pole and the second primary stator pole.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
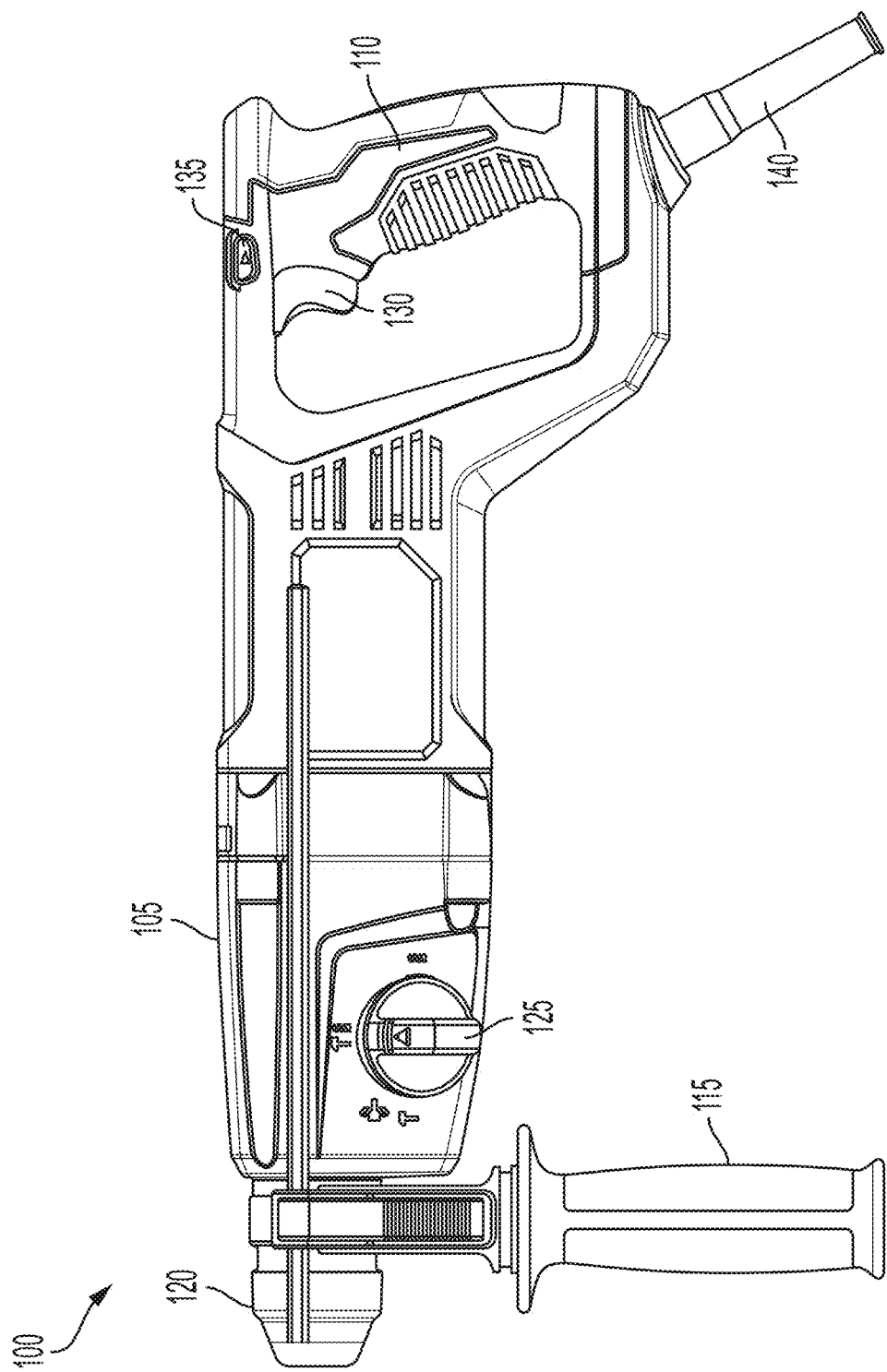
FIG. 1 is a plan view of a power tool in accordance with some embodiments.

FIG. 1 illustrates an example embodiment of a hand held power tool 100. In the example illustrated, the power tool 100 is a rotary hammer. The power tool 100 includes a main housing 105, a handle housing 110, a side handle 115, and bit holder 120. The main housing 105 houses a motor 200 (shown in FIG. 2) of the power tool 100 and includes a mode selector input or knob 125. The handle housing 110 includes a trigger 130 and a control switch 135. The side handle 115 is provided at a front of the power tool 100 opposite the handle housing 110 to provide additional support during operation of the power tool 100. A power cord 140 provides operating alternating current ("AC") power to a power source input (e.g., junction of housing 110 and power cord 140) for operation of the power tool 100. In some embodiments, rather than a power cord 140, the power tool 100 may include a battery pack to provide operating power to the power tool 100.

The mode selector knob 125 can be rotated between different positions to select an operation mode of the power tool 100. In one example, the power tool 100 may be operated in three modes: (i) a rotation only mode; (ii) a rotary hammer mode; and (iii) a hammering only mode. In these embodiments, the mode selector knob 125 can be rotated between three positions corresponding to each of the three modes listed above. In other embodiments, the power tool 100 may include different kinds and number of modes and the positions of the mode selector knob 125 are modified accordingly. In some embodiments, rather the mode selector knob 125 may not be a knob and may include a multi-position switch, a slider switch, or the like or may be eliminated from the main housing 105 in lieu of a software based switch provided on a connected device (e.g., a connected smartphone).

In the example illustrated, the trigger 130 is a variable speed trigger that controls the amount of power delivered to the motor 200 to correspondingly vary the speed of the motor 200. The control switch 135 (e.g., a FORWARD/REVERSE selector) can be toggled to select a direction of rotation of the motor 200. When a forward direction is selected, the motor 200 rotates in a clockwise or forward direction to perform tightening or fastening operations. When a reverse direction is selected, the motor 200 rotates in a counterclockwise or reverse direction to perform loosening or unfastening operations.

Figure 2:
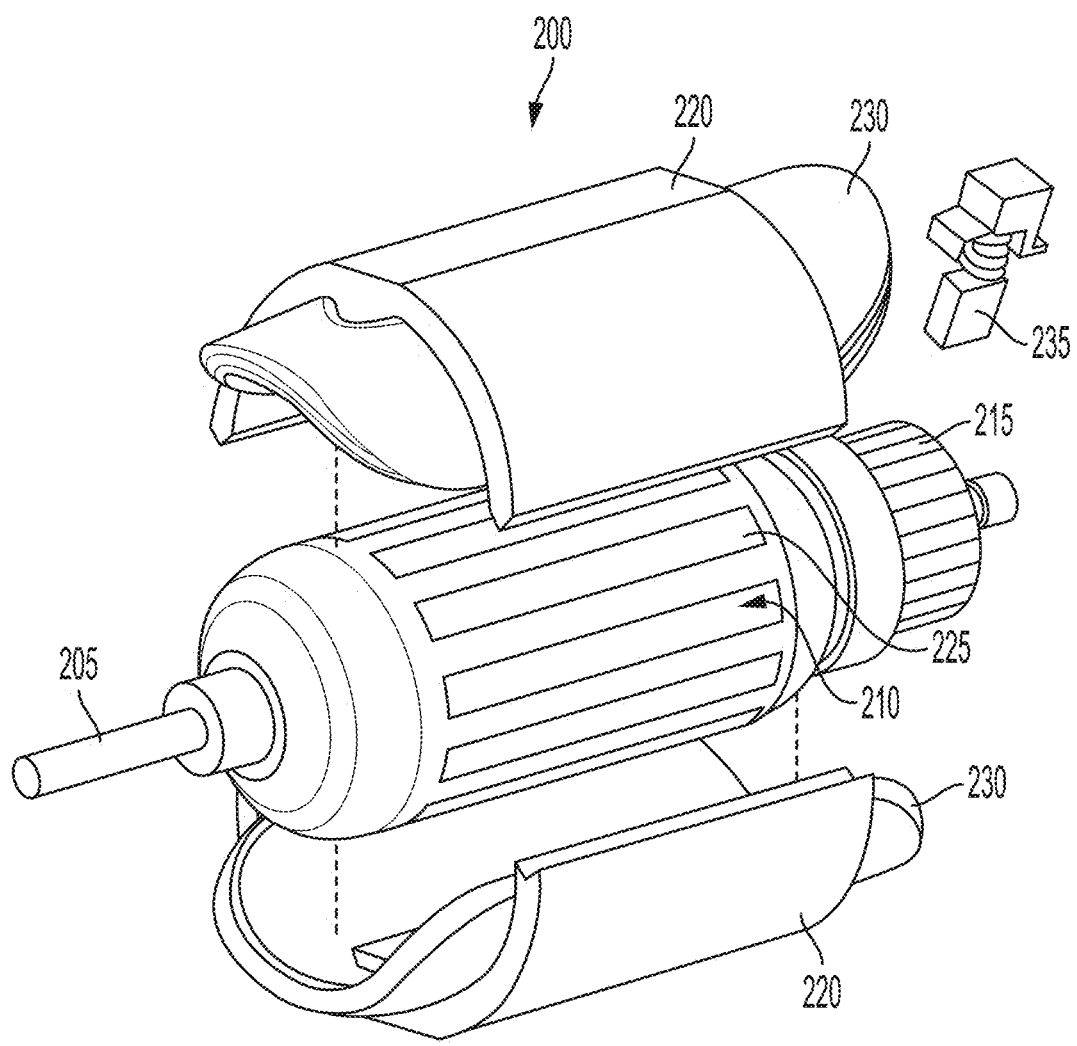
FIG. 2 is a partially exploded view of a universal motor of the power tool of FIG. 1 in accordance with some embodiments.

FIG. 2 illustrates a partially exploded view of the motor 200 of the power tool 100. In the example illustrated, the motor 200 is a two-poled brushed motor (e.g., a universal motor). The motor 200 includes a rotatable shaft or arbor 205 supporting an armature 210 and a commutator 215. The motor 200 also includes a field stack or stator stack 220 that forms a stator of the motor 200. In the illustrated example, the stator stack 220 includes first and second stack parts that are coupled to form the stator stack 220. In other embodiments, the stator stack 220 includes a singular integral piece.

The armature 210 includes a core 225 that is configured as a wire winding support structure. One or more coil wires or windings are wound on the core 225. The commutator 215 includes segments that correspond to the winding segments of the armature 210. Electric current to the commutator segments is provided using one or more brushes 235 that make contact with the commutator segments. The stator stack 220 includes two field windings 230 that form two magnetic poles of the motor 200. Electric current from the power source (e.g., the power cord 140) is provided to the field windings 230. The electric current flowing through the filed windings 230 create a magnetic pole at each of the field windings 230. Similarly, the electric current flowing through the armature winding segments creates magnetic poles in the armature 210. A rotational torque is generated on the armature due to the magnetic forces of the magnetic poles in the filed windings 230 and the armature 210.

Figure 4A:
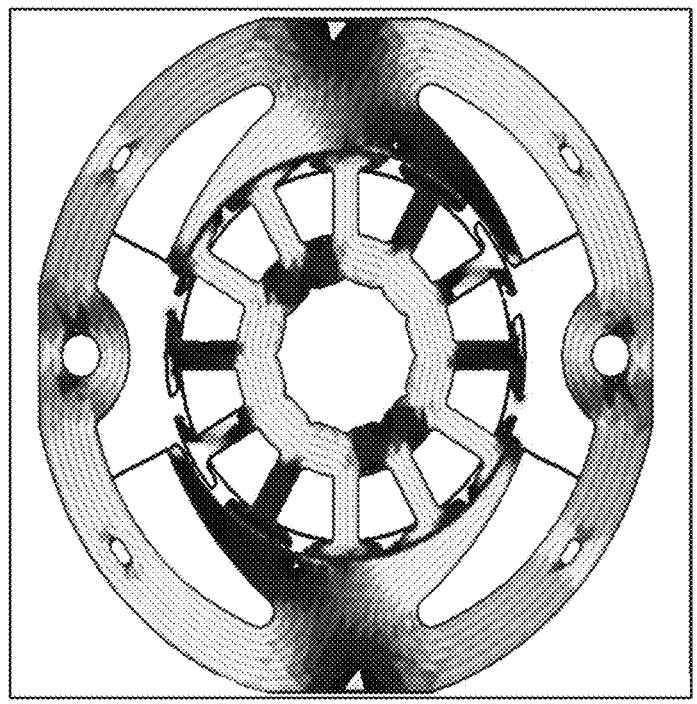
FIGS. 4A and 4B are graphical representations of magnetic flux improvements observed in the universal motor of FIG. 3 in accordance with some embodiments.

To maintain efficiency, the electric current from one armature segment may be switched to the next armature segment when the armature 210 is in a neutral plane. Theoretically, the neutral plane occurs when the one armature segment is in front of the field windings 230 aligning the magnetic fields of the armature segment and the field windings 230. However, under heavy loads, currents flowing in the armature 210 create magnetic fields that oppose or distort those produced by the stator (also known as field distortion). The rotational shift (as shown in FIG. 4A) of the magnetic fields can interfere with good commutation at the brush-commutator interface, causing increased heating and sparking.

Commutation timing advance or bar advance may be used to counter the effects of field distortion. Specifically, the timing of the switch from the one armature segment to the next armature segment may be advanced to before the theoretical neutral plane. Commutation timing advance may be performed mechanically by configuring the alignment of the brushes 235 and the commutator 215. Commutation timing advance provides good commutation and power performance in the dominant (e.g., forward) direction of rotation. However, when the motor direction is reversed, the commutation and power performance is significantly lower. This is particularly noticeable in reversible power tools 100 such as, for example, rotary hammers. In order to achieve full or maximum power output in both directions (i.e., substantially the same power output in both directions), some brushed AC motors would require elaborate rotatable brush rings.

Figure 3:
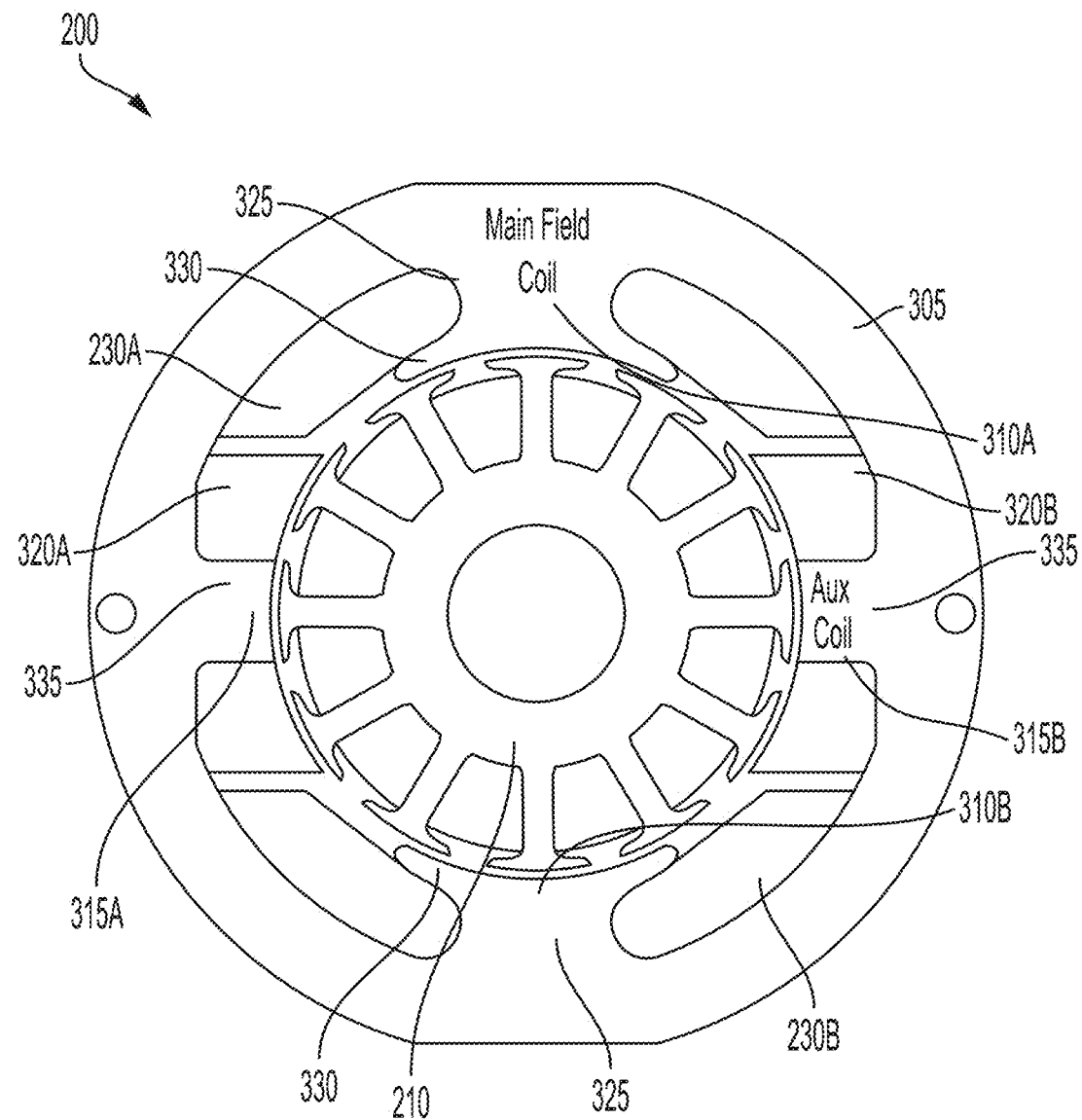
FIG. 3 is a plan view of the universal motor of FIG. 2 in accordance with some embodiments.

FIG. 3 is a cross-sectional plan view of the motor 200 showing the stator stack 220 and the armature 210. The stator stack 220 includes a core 305, primary poles 310A, 310B extending inwards from the core 305, and interpoles 315A, 315B extending inwards from the core 305. The primary poles include a first primary pole 310A and a second primary pole 310B on opposite ends of the core 305. The interpoles include a first interpole 315A and a second interpole 315B on opposite ends of the core 305. The primary poles 310A, 310B and the interpoles 315A, 315B are provided alternatively around the circumference of the core 305. The first interpole 315A is provided adjacent the first primary pole 310A and the second primary pole 310B. The second interpole 315B is provided adjacent the first primary pole 310A and the second primary pole 310B opposite the first interpole 315A. In some embodiments, the interpoles 315A, 315B are positioned halfway between the primary poles 310A, 310B. In some embodiments, the motor 200 achieves full or maximum power output in both the forward rotational direction and the reverse rotational direction (i.e., substantially the same power output in both directions) without requiring, for example, rotatable brush rings.

A first field winding 230A and a second field winding 230B are respectively wound around the first primary pole 310A and the second primary pole 310B. A first auxiliary winding 320A and a second auxiliary winding 320B are wound around the first interpole 315A and the second interpole 315B, respectively. In some embodiments, the auxiliary windings 320a, 320B are wired in series with the field windings 230A, 230B and the armature windings.

The primary poles 310A, 310B include a pole neck 325 extending inwards from the core 305 and a pole arc 330 extending laterally from the pole neck 325. In a conventional motor, pole arcs 330 extend circumferentially towards a center point between the first primary pole 310A and the second primary pole 310B (as shown in FIG. 4A). In the motor 200, the pole arcs 330 are reduced to accommodate the interpoles 315A, 315B. The interpoles 315A, 315B include an interpole neck 335 extending inwards from the core 305. However, the interpoles 315A, 315B do not include an arc extending laterally from the interpole neck 335.

In some embodiments, the primary poles 310A, 310B and the interpoles 315A, 315B are constructed integrally with the core 305. In other embodiments, one or both of the primary poles 310A, 310B and the interpoles 315A, 315B are constructed as bobbins that are inserted on to the core 305 and held in place by a retaining feature on the core 305 or by an adhesive.

Figure 4B:
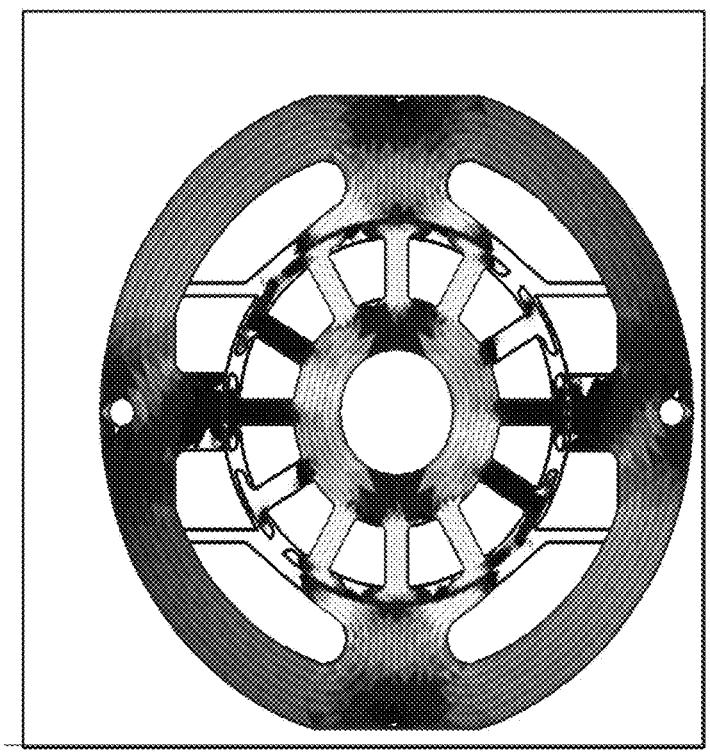

The motor 200 including interpoles 315A, 315B provides several advantages over a conventional motor. FIGS. 4A and 4B show the magnetic fields lines 410 and 420 generated in the stator stack 220 and the armature 210 of a conventional motor and the motor 200, respectively. FIG. 4A illustrates the magnetic fields in a conventional motor and FIG. 4B illustrates the magnetic fields in the motor 200 including interpoles 315A, 315B. As can be seen in FIG. 4A, there is significant distortion on the upper pole arc (right hand side of upper pole arc in FIG. 4A) and lower pole arc (left hand side of lower pole arc in FIG. 4A).

As illustrated in FIG. 4B, the addition of the interpoles 315A, 315B nearly cancels out the armature 210 reaction and the field distortion is greatly reduced. As a result, commutation timing advance is no longer required, thereby providing better commutation and similar power performance (e.g., efficiency, power output, etc.) in either direction of rotation and under a wide range of speeds and loads. The improved commutation results in low or reduced heating and low or reduced sparking. Further, the reduced field distortion leads to improved braking with reduced impact to brush life, in those applications employing motor braking.

It should be noted that reducing the length of the pole arc 330 generally reduces the power output of the motor 200 and reduces field distortion somewhat by itself. However, as can be seen from FIGS. 4A and 4B, the reduction of the pole arc 330 and the addition of the interpoles 315 produces an unexpected result of further reducing field distortion while maintaining the operating efficiency and power output of the motor. Additionally, adding interpoles 315A, 315B in a smaller size motor, for example, a motor having a weight below 75 kilograms (kgs) is generally not considered due to the smaller size of the motor. Specifically, adding interpoles 315 reduces the size of the primary poles, usually resulting in a reduced power performance of the motor.

In some embodiments, the motor 200 (e.g., stator stack 220 and armature 210) has a weight below 75 kgs. Specifically, the motor has weight below 1 kg. In some embodiments, the motor 200 has a weight between 200 grams (g) and 1 kg. In some embodiments, the motor 200 has a stator diameter below 100 millimeters (mm). In some embodiments, the motor 200 has a stator diameter between 20 mm and 100 mm. As described above, adding the interpoles 320 and reducing length of the pole arcs 330 of the motor 200 produces an unexpected result of further reduced field distortion while maintaining the operating efficiency and power output of the motor 200 compared to a conventional motor of the same size. In a conventional motor, a single pole arc 330 of a primary pole 310 covers, for example, greater than 40% of the circumference of the armature 210. The pole arcs 330 of the primary poles cover, for example, greater than 80% of the circumference of the armature 210. In the motor 200, the pole arcs 330 cover less than 80% of the circumference of the armature. In some embodiments, the pole arcs 330 cover between 10% and 80% of the circumference of the armature. In some embodiments, the pole arcs 330 cover between 30% and 60% of the circumference of the armature. In some embodiments, the motor 200 is operated without commutation timing advance due to the reduced field distortion in the motor 200. This allows for removal of any mechanical advance in brushes and reduces the complexity of the motor 200.

Thus, embodiments described herein provide, among other things, a universal motor with interpoles. Various features and advantages are set forth in the following claims.

What is claimed is:

1. A hand held power tool comprising:
   a housing of the hand held power tool;
   a power source input configured to receive power from a power source;
   a brushed motor located within the housing of the hand held power tool, the brushed motor configured to receive power from the power source input, the brushed motor including:
      a first primary stator pole including a first pole neck and a first pole arc,
      a second primary stator pole including a second pole neck and a second pole arc,
      a first stator interpole including a first interpole neck, and
      a second stator interpole including a second interpole neck,
   wherein the first stator interpole and the second stator interpole are each positioned between the first primary stator pole and the second primary stator pole.

2. The hand held power tool of claim 1, wherein the first stator interpole and the second stator interpole are each positioned halfway between the first primary stator pole and the second primary stator pole.

3. The hand held power tool of claim 1, wherein the power source is an alternating current power source.

4. The hand held power tool of claim 1, wherein the brushed motor does not include any mechanical bar advance.

5. The hand held power tool of claim 1, further comprising a control switch configured to change a rotational direction of the brushed motor.

6. The hand held power tool of claim 1, further comprising one or more brushes and a commutator.

7. The hand held power tool of claim 6, wherein the one or more brushes are not rotatable.

8. The hand held power tool of claim 1, wherein the brushed motor weighs less than one kilogram.

9. The hand held power tool of claim 8, wherein the brushed motor weighs between 200 grams and one kilogram.

10. The hand held power tool of claim 1, wherein the first pole arc and the second pole arc combine to cover less than 80% of a circumference of an armature.

11. The hand held power tool of claim 10, wherein the first pole arc and the second pole arc combine to cover between 10% and 80% of the circumference of the armature.

12. The hand held power tool of claim 11, wherein the first pole arc and the second pole arc combine to cover between 30% and 60% of the circumference of the armature.

13. A hand held power tool comprising:
a housing of the hand held power tool;
a motor located within the housing of the hand held power tool, the motor configured to receive power from a power source, the motor including:
a first primary stator pole including a first pole neck and a first pole arc,
a second primary stator pole including a second pole neck and a second pole arc,
a first stator interpole including a first interpole neck, and
a second stator interpole including a second interpole neck,
wherein the first stator interpole and the second stator interpole are each positioned between the first primary stator pole and the second primary stator pole.

14. The hand held power tool of claim 13, further comprising a control switch configured to change a rotational direction of the motor.

15. The hand held power tool of claim 13, wherein the brushed motor weighs less than one kilogram.

16. The hand held power tool of claim 13, wherein the first pole arc and the second pole arc combine to cover less than 80% of a circumference of an armature of the motor.

17. The hand held power tool of claim 13, further comprising a first field winding, a second field winding, a first auxiliary winding, and a second auxiliary winding,
wherein the first auxiliary winding and the second auxiliary winding are wired in series with the first field winding and the second field winding.

18. A hand held power tool comprising:
a housing of the hand held power tool;
a motor located within the housing of the hand held power tool, the motor configured to receive power from a power source and be operated in a forward direction of rotation and a reverse direction of rotation, the motor including:
a first primary stator pole including a first pole neck and a first pole arc,
a second primary stator pole including a second pole neck and a second pole arc,
a first stator interpole including a first interpole neck, and
a second stator interpole including a second interpole neck,
wherein the first stator interpole and the second stator interpole are each positioned between the first primary stator pole and the second primary stator pole.

19. The power tool of claim 18, wherein the first stator interpole and the second stator interpole are each positioned halfway between the first primary stator pole and the second primary stator pole.

20. The power tool of claim 19, wherein the motor is configured to achieve substantially the same power output in both the forward direction of rotation and the reverse direction of rotation.

* * * * *